United States Patent
Nishimura et al.

(10) Patent No.: US 10,647,791 B2
(45) Date of Patent: May 12, 2020

(54) POLYVINYL ALCOHOL USED AS DISPERSING AGENTS FOR POLYVINYL CHLORIDE SUSPENSION POLYMERIZATION, DISPERSING AGENTS COMPRISING THE POLYVINYL ALCOHOL, AND METHOD FOR PRODUCING POLYVINYL CHLORIDE USING THE POLYVINYL ALCOHOL

(71) Applicants: SEKISUI CHEMICAL CO., LTD., Osaka (JP); SEKISUI SPECIALTY CHEMICALS AMERICA, LLC, Dallas, TX (US)

(72) Inventors: Yohei Nishimura, Osaka (JP); Yasunari Kusaka, Osaka (JP); Nami Nakajima, Osaka (JP); Hidehiro Yamaguchi, Dallas, TX (US)

(73) Assignees: SEKISUI CHEMICAL CO., LTD., Osaka (JP); SEKISUI SPECIALITY CHEMICALS AMERICA, LLC, Dallas, TX (US)

( * ) Notice: Subject to any disclaimer, the term of this patent is extended or adjusted under 35 U.S.C. 154(b) by 160 days.

(21) Appl. No.: 15/941,104

(22) Filed: Mar. 30, 2018

(65) Prior Publication Data
US 2019/0300627 A1    Oct. 3, 2019

(51) Int. Cl.
  C08F 14/06    (2006.01)
  C08F 16/06    (2006.01)
  C08J 3/05     (2006.01)

(52) U.S. Cl.
  CPC .............. *C08F 14/06* (2013.01); *C08F 16/06* (2013.01); *C08J 3/05* (2013.01); *C08F 2810/00* (2013.01); *C08J 2327/06* (2013.01); *C08J 2429/04* (2013.01)

(58) Field of Classification Search
  CPC .... C08F 16/06; C08F 2810/10; C08J 2429/04
  See application file for complete search history.

(56) References Cited

U.S. PATENT DOCUMENTS

2004/0152834 A1*  8/2004  Kato ............... C08F 2/20
                                                       525/62
2004/0186232 A1*  9/2004  Shibutani ......... C08F 2/20
                                                       525/61

FOREIGN PATENT DOCUMENTS

JP    2004-250695    9/2004
WO    2016/141256    9/2016

* cited by examiner

*Primary Examiner* — Mark S Kaucher
(74) *Attorney, Agent, or Firm* — Wenderoth, Lind & Ponack, L.L.P.

(57) ABSTRACT

The polyvinyl alcohol according to the present invention to be used as a dispersant for suspension polymerization for polyvinyl chloride has a degree of saponification of 60 to 80 mol %, a block character of 0.4 to 0.6, an integration value defined by the following (a) of 0.04 to 0.1 and an integration value defined by the following (b) of 0.01 to 0.2 in a $^1$H-NMR spectrum, and a 0.1% by mass aqueous solution of the polyvinyl alcohol has a UV absorbance at a wavelength of 320 nm of 0.18 or more and less than 0.3.

(a) An integration value from 5.42 to 5.62 ppm of a peak or peaks observed at 5.50 to 5.54 ppm when an integration value from 3.65 to 4.05 ppm of a peak or peaks observed at 3.83 to 3.87 ppm is assumed to be 100.

(b) An integration value from 5.76 to 5.98 ppm of a peak or peaks observed at 5.86 to 5.90 ppm when an integration value from 3.65 to 4.05 ppm of a peak or peaks observed at 3.83 to 3.87 ppm is assumed to be 100.

11 Claims, 3 Drawing Sheets

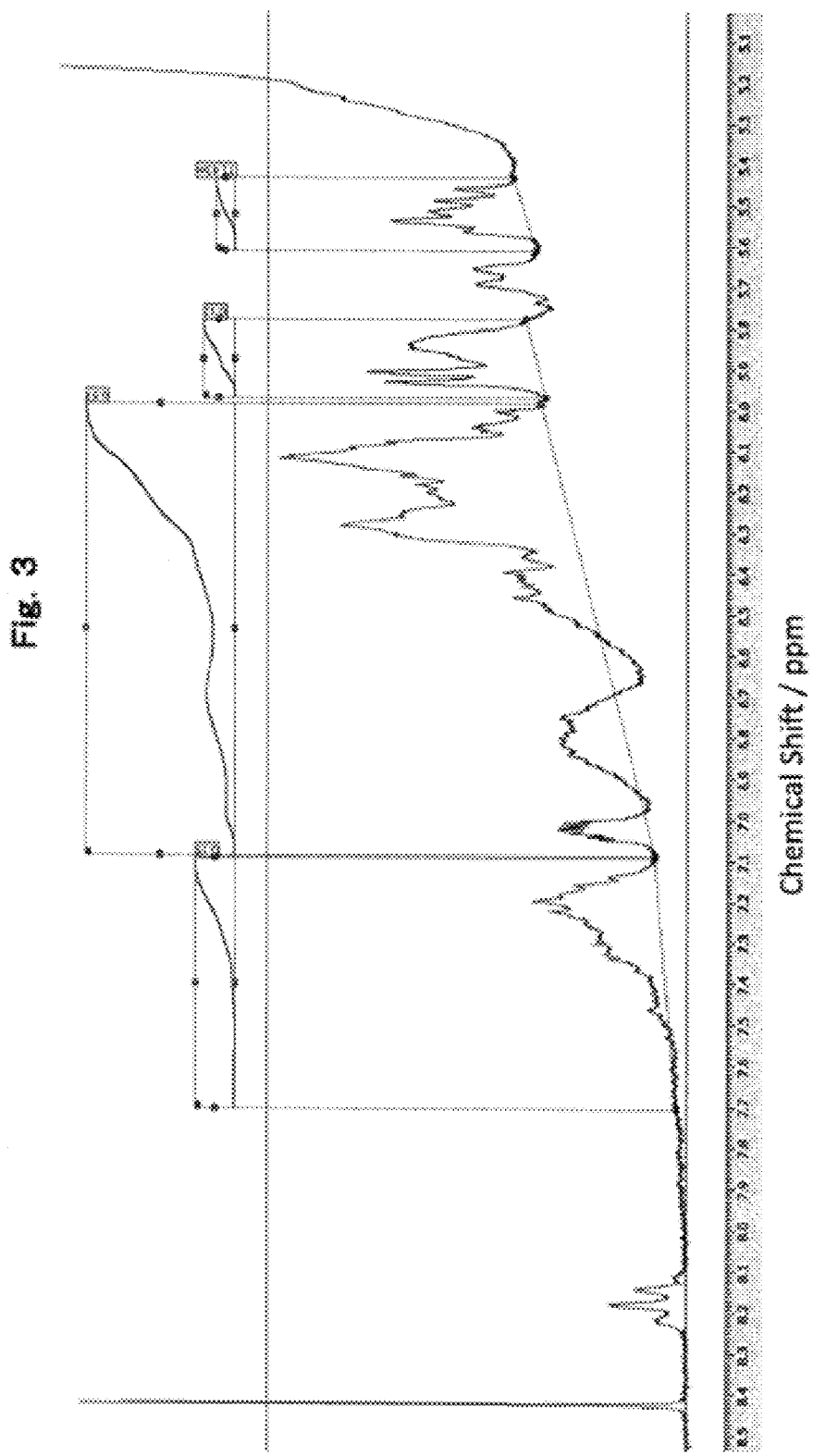

POLYVINYL ALCOHOL USED AS DISPERSING AGENTS FOR POLYVINYL CHLORIDE SUSPENSION POLYMERIZATION, DISPERSING AGENTS COMPRISING THE POLYVINYL ALCOHOL, AND METHOD FOR PRODUCING POLYVINYL CHLORIDE USING THE POLYVINYL ALCOHOL

TECHNICAL FIELD

The present invention relates to polyvinyl alcohol to be used as a dispersant for suspension polymerization for polyvinyl chloride, a dispersant comprising the polyvinyl alcohol, and a method for producing polyvinyl chloride using the polyvinyl alcohol.

BACKGROUND ART

Polyvinyl chloride is generally produced by subjecting a vinyl chloride monomer to suspension polymerization. The suspension polymerization is performed dispersing the vinyl chloride monomer in water in the presence of a dispersant such as polyvinyl alcohol.

Various types of dispersants are studied from the viewpoint of suppressing foaming during polymerization, the viewpoint of producing polyvinyl chloride having a desired particle diameter and particle diameter distribution, and other viewpoints.

JP 2004-250695 A (hereinafter, referred to as "PTL1") describes a polyvinyl alcohol-based dispersant having a carbonyl group in a molecule thereof, having a block character in a particular range, and exhibiting a particular ultraviolet absorption spectrum. International Publication No. WO 2016/141256 (hereinafter, referred to as "PTL2") describes a dispersant containing polyvinyl alcohol having a degree of saponification, an absorbance at 320 nm, a block character, a clouding point, and the like each adjusted in a particular range.

In the case where the dispersant described in PTL1 is used, there is a tendency that the particle diameter of polyvinyl chloride which is produced is relatively large, and it is considered that the dispersing ability needs to be further improved. In addition, in the case where the dispersant described in PTL2 is used, the dispersant has a high dispersing ability, and therefore the particle size of polyvinyl chloride which is produced becomes too fine, so that handling becomes difficult. Moreover, the porosity of polyvinyl chloride which is obtained becomes low, so that the processability is lost. When the amount of the dispersant which is added is made small to adjust the particle diameter appropriately, the porosity becomes lower and foaming during polymerization of vinyl chloride is observed frequently, and therefore there is room for improvements in terms of productivity.

SUMMARY OF INVENTION

In light of such problems of the conventional techniques, the present invention intends to provide: polyvinyl alcohol which has a good dispersing ability, which can suppress foaming during polymerization, which can produce polyvinyl chloride having a good handling property and a good processability, and which is to be used as a dispersant for suspension polymerization for polyvinyl chloride; and a method for producing polyvinyl chloride using the polyvinyl alcohol.

The present invention is as follows.
[1] Polyvinyl alcohol to be used as a dispersant for suspension polymerization for polyvinyl chloride, the polyvinyl alcohol having: a degree of saponification of 60 to 80 mol %; a block character of 0.4 to 0.6; an integration value defined by the following (a) of 0.04 to 0.1 and an integration value defined by the following (b) of 0.01 to 0.2 in a $^1$H-NMR spectrum; and an UV absorbance of 0.18 or more and less than 0.3 measured at wavelength of 320 nm with respect to a 0.1% by mass aqueous solution of the polyvinyl alcohol:
(a) an integration value from 5.42 to 5.62 ppm of a peak or peaks observed at 5.50 to 5.54 ppm when an integration value from 3.65 to 4.05 ppm of a peak or peaks observed at 3.83 to 3.87 ppm is assumed to be 100; and
(b) an integration value from 5.76 to 5.98 ppm of a peak or peaks observed at 5.86 to 5.90 ppm when an integration value from 3.65 to 4.05 ppm of a peak or peaks observed at 3.83 to 3.87 ppm is assumed to be 100.
[2] The polyvinyl alcohol according to [1] above, having a carbonyl group index of 0.5 or more.
[3] The polyvinyl alcohol according to [1] or [2] above, having an integration value defined by the following (c) of 0.2 to 0.7 and an integration value defined by the following (d) of 0.1 to 0.2:
(c) an integration value from 5.98 to 7.09 ppm of a peak or peaks observed at 6.51 to 6.55 ppm when an integration value from 3.65 to 4.05 ppm of a peak or peaks observed at 3.83 to 3.87 ppm is assumed to be 100; and
(d) an integration value from 7.09 to 7.72 ppm of a peak or peaks observed at 7.39 to 7.41 ppm when an integration value from 3.65 to 4.05 ppm of a peak or peaks observed at 3.83 to 3.87 ppm is assumed to be 100.
[4] The polyvinyl alcohol according to any one of [1] to [3] above, wherein a 4% by mass aqueous solution of the polyvinyl alcohol has a viscosity of 4 to 10 cP.
[5] The polyvinyl alcohol according to any one of [1] to [4] above, having a clouding point of 35 to 50° C.
[6] A dispersant comprising the polyvinyl alcohol according to any one of [1] to [5] above.
[7] The polyvinyl alcohol according to any one of [1] to [5] above, produced by a production method comprising the following steps (1) to (3):
a step (1) of producing a polyvinyl ester by polymerizing a vinyl ester monomer;
a step (2) of producing a partially saponified polyvinyl ester by partially saponifying the polyvinyl ester; and
a step (3) of heat-treating the partially saponified polyvinyl ester.
[8] The polyvinyl alcohol according to [7] above, wherein the vinyl ester monomer is a vinyl acetate monomer.
[9] The polyvinyl alcohol according to [7] or [8] above, wherein the partial saponification is performed in the presence of a peroxide and an alkali compound.
[10] The polyvinyl alcohol according to [9] above, wherein the peroxide is hydrogen peroxide, and the alkali compound is sodium hydroxide.
[11] A method for producing polyvinyl chloride, the method comprising: a step of preparing a suspension liquid by mixing the polyvinyl alcohol according to any one of [1] to [5] and [7] to [10] above, a vinyl chloride monomer, and water; and a step of polymerizing the vinyl chloride monomer.

BRIEF DESCRIPTION OF DRAWINGS

FIG. 3 is a diagram illustrating (a) to (d) in the $^1$H-NMR spectrum of polyvinyl alcohol S1.

DESCRIPTION OF EMBODIMENTS

[Polyvinyl Alcohol]

Figure 1:
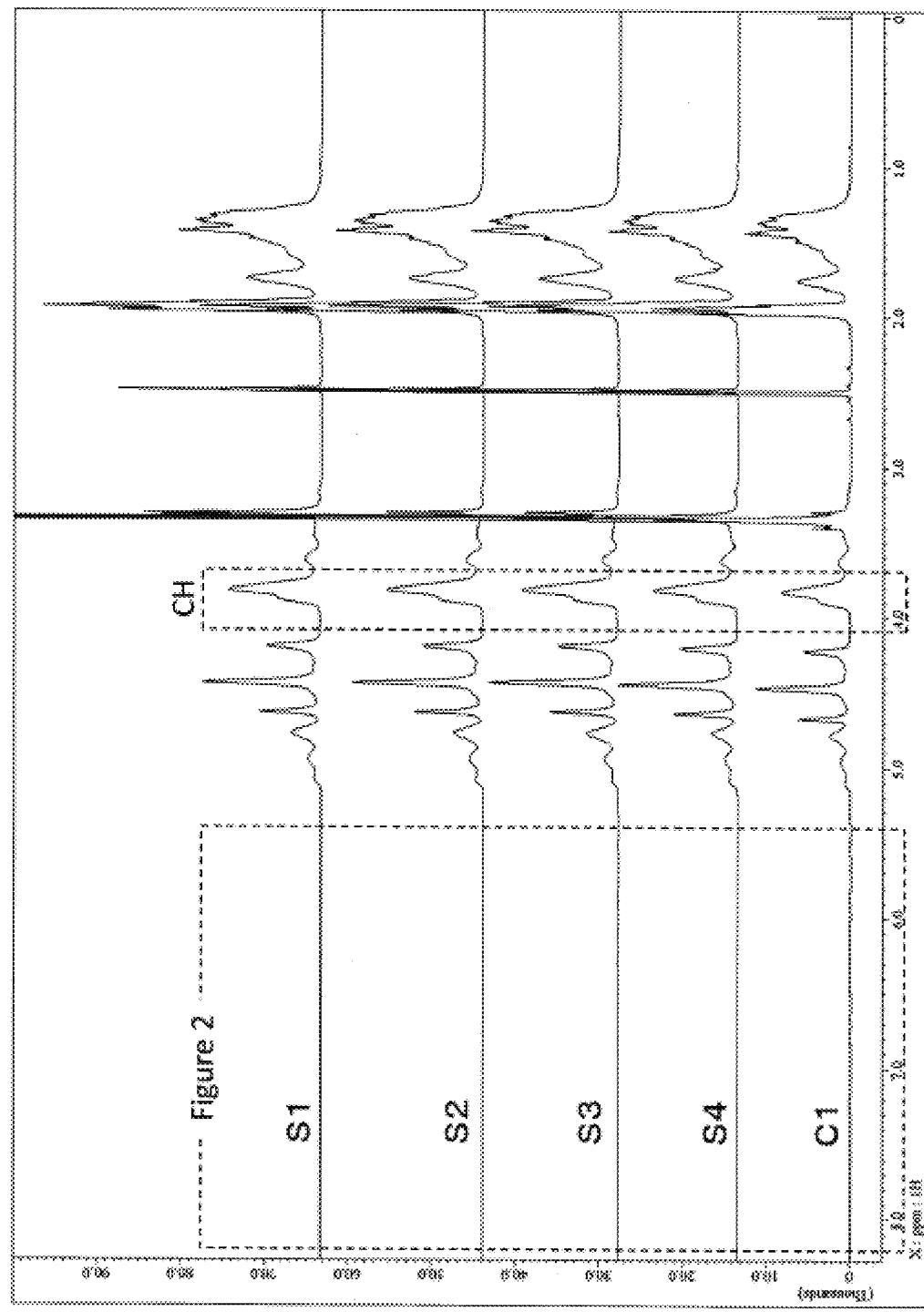
FIG. 1 shows $^1$H-NMR spectra for polyvinyl alcohols S1 to S4 and C1 obtained in Examples and Comparative Examples.

The polyvinyl alcohol according to the present invention is to be used as a dispersant for suspension polymerization for polyvinyl chloride. The polyvinyl alcohol is produced through a step of partially saponifying a polyvinyl ester. For example, the polyvinyl alcohol according to the present invention produced using polyvinyl acetate as the polyvinyl ester through a step of partially saponifying the polyvinyl acetate has a constituent unit represented by the following formula.

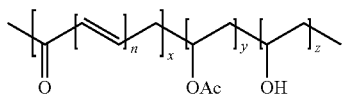

In the formula, OAc represents an acetoxy group that is a residual ester group, and x, y, and z represents molar fractions of the respective constituent units in the polymer, x+y+z=1, each of x, y, and z is 0 to 1, and none of x, y, and z is 0. The formula has an acetoxy group, a hydroxy group, a carbonyl group, and a double bond that is adjacent to the carbonyl group in the molecular chain. The double bond is a conjugated double bond having one double bond and/or two or more double bonds. It is preferable that n be 1 to 5, more preferably 1 to 3. It is considered that the amount, configuration, and the like of each of these structures are related to the performance as a dispersant, and therefore when the rate of saponification, the block character, the absorbance at 320 nm, the area ratio in the $^1$H-NMR spectrum, and the like, which reflect the amount, configuration, and the like of each of these structures, are each set in a particular range, it has been found that polyvinyl alcohol that has a good dispersing ability and that can suppress foaming during polymerization is obtained, and thus the present invention has been completed.

Hereinafter, the polyvinyl alcohol according to the present invention will be described in detail.

(Degree of Saponification)

The polyvinyl alcohol according to the present invention has a degree of saponification of 60 to 80 mol %. By setting the degree of saponification in such a range, the dispersing ability when the polyvinyl alcohol is used as a dispersant for suspending polyvinyl chloride becomes good. From the viewpoint of making the dispersing ability better, the degree of saponification is preferably 70 to 80 mol %.

It is to be noted that the degree of saponification can be measured in accordance with JIS K6726.

(Block Character)

The residual ester group in the polyvinyl alcohol according to the present invention has a block character of 0.4 to 0.6. When the block character takes such a value, the dispersing ability when the polyvinyl alcohol is used as a dispersant for suspending polyvinyl chloride becomes good. It is considered that this is because when the distribution of the residual ester groups shows a relatively high block property, stable emulsion or suspension liquid is easily formed. From the viewpoint of making the dispersing ability better, the residual ester group in the polyvinyl alcohol preferably has a block character of 0.4 to 0.5.

It is to be noted that the block character usually takes a value of 0 to 2, the block property of the distribution of the residual ester groups is higher as the block character is closer to 0, the random property is higher as the block character is closer to 1, and the alternating property is higher as the block character is closer to 2.

The block character (η) of the residual ester group is an index that indicates the distribution of the residual ester groups in the polyvinyl alcohol and is determined from the analysis of peaks that appear in a methine region in the $^1$H-NMR spectrum. Each of the peaks splits into three according to the three-chain structure where the adjacent substituent is a hydroxy group (O) or a residual ester group (A). Specifically, each of the peaks splits into (OAO), (AAO), or (AAA) at the residual ester group peak center, and each of the peaks splits into (OOO), (AOO), or (AOA) at the hydroxy group center. The absorption intensity is in proportion to the abundance ratio of the structure. The block character (η) is represented by the following (Expression 1). It is to be noted that in the case where, for example, vinyl acetate is used as a raw material, the residual ester group (A) represents a residual acetoxy group (OAc group).

$$\eta = \frac{(OAO) + 0.5\,(AAO)}{(AAA) + (AAO) + (OAO)} + \frac{(AOA) + 0.5\,(AOO)}{(OOO) + (AOO) + (AOA)} \quad \text{(Expression 1)}$$

An area of a spectrum may not be determined accurately because of the interference of water mixed into a solvent or a specimen during NMR measurement. In that case, 0.5 wt % of deuterated trifluoroacetic acid may be added to the specimen to shift the peak of water, or the peak of water may be removed at the time of NMR measurement by adding a pulse series that saturates the peak of water.

In addition, the details on measurement/analysis are described in a prior literature (Macromolecules, 1982, 15, 1071).

(UV Absorbance)

The UV absorbance of a 0.1% by mass aqueous solution of the polyvinyl alcohol according to the present invention at a wavelength of 320 nm is 0.18 or more and less than 0.30. When the UV absorbance of the polyvinyl alcohol is less than 0.18, the dispersing ability when the polyvinyl alcohol is used as a dispersant for suspension polymerization for polyvinyl chloride is liable to become poor. When the UV absorbance of the polyvinyl alcohol is 0.30 or more, the average particle diameter of the polyvinyl chloride which is obtained becomes too small, there is a tendency that the handling property becomes poor. In addition, in the case where the amount of use of the polyvinyl alcohol having a UV absorbance of 0.30 or more is reduced, there is a tendency that although the average particle diameter of the polyvinyl chloride which is obtained becomes large, but the porosity becomes low to make the processability poor. Furthermore, in the case where the amount of use of the polyvinyl alcohol having a UV absorbance of 0.30 or more is reduced, foaming during polymerization of vinyl chloride is liable to occur frequently.

From the viewpoint of making the dispersing ability good, reducing foaming during polymerization, and obtaining polyvinyl chloride having a good handling property and a good processability, the UV absorbance of the 0.1% by mass aqueous solution of the polyvinyl alcohol at a wavelength of 320 nm is preferably 0.20 or more and 0.29 or less.

As described above, the polyvinyl alcohol according to the present invention has double bonds. Some of the double bonds form a conjugated double bond along the polymer main chain adjacent to a carbonyl group, as shown in the following formulas (2) and (3).

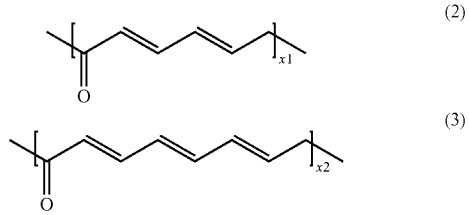

Formula (2) represents a conjugated double bond moiety having two double bonds adjacent to a carbonyl group in the polyvinyl alcohol, and formula (3) represents a conjugated double bond moiety having three double bonds adjacent to a carbonyl group in the polyvinyl alcohol. The UV absorbance at a wavelength of 320 nm is a value that reflects the amount of the conjugated double bond (3) above having three double bonds, and therefore a larger UV absorbance at a wavelength of 320 nm means that a larger amount of the conjugated double bond moieties having three double bonds exists in the polyvinyl alcohol, and this simultaneously means that the amount of carbonyl group adjacent to the conjugated double bond is also larger. It is considered that the polyvinyl alcohol in which a certain amount of particular structure of (3) as described above exists easily interacts with the vinyl chloride monomer, so that the dispersing ability becomes good, and the foaming property during the polymerization of vinyl chloride can be reduced.

($^1$H-NMR Spectrum)

The polyvinyl alcohol according to the present invention has an integration value defined by the following (a) of 0.04 to 0.1 and an integration value defined by the following (b) of 0.01 to 0.2 in the $^1$H-NMR spectrum.

(a) An integration value from 5.42 to 5.62 ppm of a peak or peaks observed at 5.50 to 5.54 ppm when an integration value from 3.65 to 4.05 ppm of a peak or peaks observed at 3.83 to 3.87 ppm is assumed to be 100.

(b) An integration value from 5.76 to 5.98 ppm of a peak or peaks observed at 5.86 to 5.90 ppm when an integration value from 3.65 to 4.05 ppm of a peak or peaks observed at 3.83 to 3.87 ppm is assumed to be 100.

In the $^1$H-NMR Spectrum of the polyvinyl alcohol, a peak or peaks observed at 5.50 to 5.54 ppm in (a) and a peak or peaks observed at 5.86 to 5.90 ppm in (b) refers to peaks attributable to a proton that is bonded to carbon that forms the above-described double bond (including conjugated double bond) adjacent to the carbonyl group. The double bond refers to a double bond that exists inside the polymer, not at an end portion of the polymer. Accordingly, satisfying (a) and (b) means that a certain amount of double bond adjacent to the carbonyl group exists in the molecular chain of the polyvinyl alcohol. The same applies to a peak or peaks observed at 6.51 to 6.55 ppm in (c) described later and a peak or peaks observed at 7.39 to 7.41 ppm.

<<(a)>>

The polyvinyl alcohol according to the present invention has a peak or peaks at 5.50 to 5.54 ppm in the $^1$H-NMR spectrum, and the integration value from 5.42 to 5.62 ppm of the peak or peaks is 0.04 to 0.1 when the integration value from 3.65 to 4.05 ppm of a peak or peaks observed at 3.83 to 3.87 ppm (hereinafter, also simply referred to as standard peak integration value) is assumed to be 100. When the integration value is in such a range, the dispersing ability when the polyvinyl alcohol is used as a dispersant for suspending polyvinyl chloride becomes good.

The integration value from 5.42 to 5.62 ppm of a peak or peaks observed at 5.50 to 5.54 ppm is preferably 0.05 to 0.08 when the standard peak integration value is assumed to be 100.

It is to be noted that even in the case where a peak or peaks are not clearly observed at 5.50 to 5.54 ppm, the integration value in (a) can be determined by calculating an integration value from 5.42 to 5.62 ppm.

The width of the peak or peaks observed at 5.50 to 5.54 ppm may be included in a range between a lower magnetic field side and a higher magnetic field side, the range determined by setting the higher magnetic field side to, for example, about 5.42 ppm, 5.43 ppm, or 5.44 ppm and setting the lower magnetic field side to, for example, about 5.59 ppm, 5.60 ppm, 5.61 ppm or 5.62 ppm.

Similarly, the width of the peak or peaks observed at 3.83 to 3.87 ppm may be included in a range between a lower magnetic field side and a higher magnetic field side, the range determined by setting the higher magnetic field side to, for example, about 3.65 ppm or 3.7 ppm and setting the lower magnetic field side to, for example, about 4.0 ppm or 4.05 ppm.

The integration value from 5.76 to 5.98 ppm of a peak or peaks observed at 5.86 to 5.90 ppm in the $^1$H-NMR spectrum of the polyvinyl alcohol according to the present invention is 0.01 to 0.2 when the standard peak integration value is assumed to be 100. When the integration value is in such a range, the dispersing ability when the polyvinyl alcohol is used as a dispersant for suspending polyvinyl chloride becomes good. The integration value from 5.76 to 5.98 ppm of the peak or peaks observed at 5.86 to 5.90 ppm is preferably 0.015 to 0.15 when the standard peak integration value is assumed to be 100.

It is to be noted that even in the case where a peak or peaks are not clearly observed at 5.86 to 5.90 ppm, the integration value in (b) can be determined by calculating an integration value from 5.76 to 5.98 ppm.

The width of the peak or peaks observed at 5.86 to 5.90 ppm may be included in a range between a lower magnetic field side and a higher magnetic field side, the range determined by setting the higher magnetic field side to, for example, about 5.76 ppm or 5.80 ppm and setting the lower magnetic field side to, for example, about 5.96 ppm or 5.98 ppm.

The polyvinyl alcohol according to the present invention preferably further has an integration value defined by the following (c) of 0.2 to 0.7 and an integration value defined by the following (d) of 0.1 to 0.2 in the $^1$H-NMR spectrum.

(c) An integration value from 5.98 to 7.09 ppm of a peak or peaks observed at 6.51 to 6.55 ppm when an integration value from 3.65 to 4.05 ppm of a peak or peaks observed at 3.83 to 3.87 ppm (standard peak integration value) is assumed to be 100.

(d) An integration value from 7.09 to 7.72 ppm of a peak or peaks observed at 7.39 to 7.41 ppm when an integration value from 3.65 to 4.05 ppm of a peak or peaks observed at 3.83 to 3.87 ppm (standard peak integration value) is assumed to be 100.

<<(c)>>

The integration value from 5.98 to 7.09 ppm of a peak or peaks observed at 6.51 to 6.55 ppm in the $^1$H-NMR spectrum of the polyvinyl alcohol according to the present invention is preferably 0.2 to 0.7 when the standard peak integration value is assumed to be 100. When the integration value is in such a range, the dispersing ability when the polyvinyl alcohol is used as a dispersant for suspending polyvinyl chloride becomes good. The integration value from 5.98 to 7.09 ppm of the peak or peaks observed at 6.51 to 6.55 ppm is more preferably 0.25 to 0.6 when the standard peak integration value is assumed to be 100.

It is to be noted that even in the case where a peak or peaks are not clearly observed at 6.51 to 6.55 ppm, the integration value in (c) can be determined by calculating an integration value from 5.98 to 7.09 ppm.

The width of the peak or peaks observed at 6.51 to 6.55 ppm may be included in a range between a lower magnetic field side and a higher magnetic field side, the range determined by setting the higher magnetic field side to, for example, about 5.98 ppm or 6.0 ppm and setting the lower magnetic field side to, for example, about 7.0 ppm or 7.09 ppm.

<<(d)>>

The integration value from 7.09 to 7.72 ppm of a peak or peaks observed at 7.39 to 7.41 ppm in the $^1$H-NMR spectrum of the polyvinyl alcohol according to the present invention is preferably 0.1 to 0.2 when the standard peak integration value is assumed to be 100. When the integration value is in such a range, the dispersing ability when the polyvinyl alcohol is used as a dispersant for suspending polyvinyl chloride becomes good. The integration value from 7.09 to 7.72 ppm of the peak or peaks observed at 7.39 to 7.41 ppm is more preferably 0.12 to 0.18 when the standard peak integration value is assumed to be 100.

It is to be noted that even in the case where a peak or peaks are not clearly observed at 7.39 to 7.41 ppm, the integration value in (d) can be determined by calculating an integration value from 7.09 to 7.72 ppm.

The width of the peak or peaks observed at 7.39 to 7.41 ppm may be included in a range between a lower magnetic field side and a higher magnetic field side, the range determined by setting the higher magnetic field side to, for example, about 7.09 ppm or 7.12 ppm and setting the lower magnetic field side to, for example, about 7.68 ppm or 7.72 ppm.

It is to be noted that the analysis of (a) to (d) in the $^1$H-NMR is in accordance with the description in International Publication No. WO 2016/141256.

The measurement conditions in $^1$H-NMR are as described in Examples.

(Carbonyl Group Index)

The carbonyl group index of the polyvinyl alcohol according to the present invention is not particularly limited but is preferably 0.5 or more. The carbonyl group index is an index based on the amount of the carbonyl group that exists in the polyvinyl alcohol, and the amount of the carbonyl group in the polyvinyl alcohol is larger as the value of the carbonyl group index is larger. The carbonyl group index is a value that reflects not only the amount of the carbonyl group that is adjacent to a double bond but also the amount of the carbonyl group that is not adjacent to a double bond. On the other hand, the UV absorbance at a wavelength of 320 nm reflects the amount of the conjugated double bond that is adjacent to a carbonyl group.

With respect to the polyvinyl alcohol according to the present invention, the dispersing ability becomes better, and it becomes easy to suppress foaming during the polymerization of vinyl chloride by setting the UV absorbance at a wave length of 320 nm to a particular value as described above and setting the carbonyl group index to 0.5 or more.

The carbonyl group index is preferably 0.5 or more, more preferably 0.6 or more.

The method for measuring the carbonyl group index is as follows. Evaluation of the carbonyl group index can be conducted through reaction selectivity of 2,4-dinitrophenylhydrazine (DNPH) to the carbonyl group and quantitative evaluation of an HPLC chromatogram (detector: UV spectrum) using the coloration property of DNPH. The details on the method for measuring the carbonyl group index are as described in Examples.

The viscosity of the polyvinyl alcohol according to the present invention is not particularly limited, but from the viewpoint of stability of suspension liquid, or the like, the viscosity of a 4% by mass aqueous solution of the polyvinyl alcohol is preferably 4 to 10 cP, more preferably 4.5 to 7.0 cP. The viscosity can be determined at 20° C. using a Brookfield viscometer (model LVDV-II+Pro) and a #18 spindle at 100 rpm.

The clouding point of the polyvinyl alcohol according to the present invention is not particularly limited but is preferably 35 to 50° C., more preferably 38 to 45° C. The clouding point refers to a temperature at which the solubility of polyvinyl alcohol is partially lost in an aqueous solution and at which a cloudy appearance is given to the solution.

The polyvinyl alcohol according to the present invention can be made into a dispersant comprising the polyvinyl alcohol. Further, a dispersion liquid comprising the polyvinyl alcohol, a vinyl chloride monomer, and water can be made using the polyvinyl alcohol according to the present invention.

The polyvinyl alcohol according to the present invention is preferably produced by the production method comprising the following steps (1) to (3) although the production method therefor is not limited.

Step (1) A step of producing a polyvinyl ester by polymerizing a vinyl ester monomer, Step (2) A step of producing a partially saponified polyvinyl ester by partially saponifying the polyvinyl ester, and Step (3) A step of heat-treating the partially saponified polyvinyl ester The step (1) is a step of producing a polyvinyl ester by polymerizing a vinyl ester monomer.

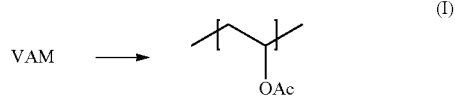

The reaction formula (I) is a simplified reaction formula that is used for describing the step (1), and shows a reaction formula when vinyl acetate (VAM) is used as the vinyl ester monomer. Ac represents an acetyl group.

In the step (1), examples of the vinyl ester monomer include vinyl formate, vinyl acetate, vinyl propionate, vinyl butyrate, vinyl pivalate, and vinyl versatate. The vinyl ester monomers may be used singly, or a plurality of vinyl ester monomers may be used together. Among these, at least vinyl acetate is preferably used, and vinyl acetate is more preferably used alone.

Polymerization can be performed in a state that is substantially free of an olefin comonomer such as ethylene, propylene, or styrene. In addition, the polymerization can be performed in a state that is free of or that is substantially free of a chain transfer agent such as an aldehyde or a ketone.

"Substantially free of a chain transfer agent" herein means that "a chain transfer agent is not added on purpose".

Examples of the polymerization method include publicly known methods such as a bulk polymerization method, a solution polymerization method, a suspension polymerization method, and an emulsion polymerization method. The polymerization can be performed at about −80 to 300° C., and a polymerization initiator such as a peroxide or azoisobutyronitrile can be used.

The step (2) is a step of producing a polyvinyl ester by partially saponifying the polyvinyl ester obtained in the step (1).

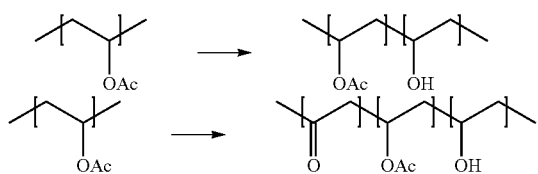

(II)

The reaction formula (II) is a simplified reaction formula that is used for describing the step (2), and shows a reaction formula in the step (2) when vinyl acetate (VAM) is used as the vinyl ester monomer. Through the step (2), some of the ester groups are saponified to change into a hydroxy group (refer to upper reaction formula in reaction formula (II)).

In the step (2), a carbonyl group may be introduced into the polymer chain by charging an oxidizing agent during the saponification reaction (refer to lower reaction formula in reaction formula (II)).

The reaction temperature in the step (2) is, for example, 10 to 70° C., preferably about 20 to about 50° C.

The partial saponification can be performed by bringing the polyvinyl ester into contact with an alkali compound and thereby performing ester exchange or direct hydrolysis. Examples of the alkali compound include: alkali metal hydroxides such as potassium hydroxide, sodium hydroxide, and lithium hydroxide; and alkali metal alkoxides such as sodium methoxide, sodium ethoxide, potassium methoxide, potassium ethoxide, and potassium t-butoxide.

Moreover, in addition to the alkali compound, an oxidizing agent is preferably used together with the alkali compound to perform the partial saponification in the presence of the two. By using the oxidizing agent together with the alkali compound, it becomes easy to introduce a carbonyl group into the polymer chain. Examples of the oxidizing agent include various types of acids, peroxides, perchlorates, and chlorinated isocyanurates. Among these, peroxides such as hydrogen peroxide and peracetic acid are preferable, more preferably hydrogen peroxide. Further, sodium hydroxide is preferably used as the alkali compound to perform the partial saponification in the presence of sodium hydroxide and hydrogen peroxide.

The amount of use of the oxidizing agent is not particularly limited but is preferably 5% by mass or less, preferably 0.5 to 2% by mass of the polyvinyl ester.

The amount of use of the alkali compound is not particularly limited but is preferably 0.0005 to 0.01 mol, more preferably 0.001 to 0.003 mol based on 1 mol of the polyvinyl ester.

As the solvent for use in the partial saponification, alcohols such as methanol, ethanol, isopropanol, n-propyl alcohol, n-butanol, isobutanol, sec-butanol, t-butanol, amyl alcohol, and cyclohexanol; cyclic ethers such as tetrahydrofuran and dioxane; ketones such as acetone, methyl ethyl ketone, methyl isobutyl ketone, and pinacolin; sulfoxides such as dimethyl sulfoxide; and hydrocarbons such as toluene, benzene, n-hexane, and cyclohexane can be used.

The partially saponified polyvinyl ester may be isolated for further treatment.

(Step 3)

The step (3) is a step of heat-treating the partially saponified polyvinyl ester.

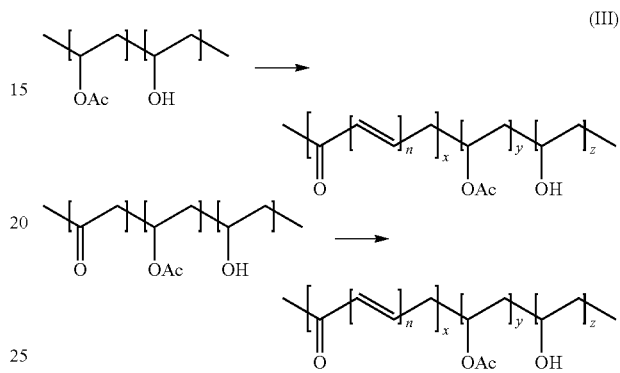

(III)

The reaction formula (III) is a simplified reaction formula that is used for describing the step (3), and shows a reaction formula in the step (3) when vinyl acetate (VAM) is used as the vinyl ester monomer. The reaction progresses by performing the heat treatment and the polyvinyl alcohol according to the present invention represented by the right side of the reaction formula is produced. It is to be noted that the reaction formula in the step (3) in the case where an upper product in the reaction formula (II) is obtained in the step (2) is represented by the upper side of the reaction formula (III), and the reaction formula in the step (3) in the case where a lower product of the reaction formula (II) is obtained in the step (2) is represented by the lower side of the reaction formula (III).

In the reaction formula, OAc represents an acetoxy group, x, y, and z represent molar fractions of the respective constituent units in the polymer, $x+y+z=1$, each of x, y, and z is 0 to 1, and none of x, y, and z is 0.

A carbonyl group is introduced into the polymer main chain by heat-treating the partially saponified polyvinyl ester. The temperature of the heat treatment is preferably 40 to 150° C., more preferably 50 to 120° C., and still more preferably 60 to 100° C.

The time for the heat-treatment is preferably 0.1 to 120 minutes, more preferably 0.5 to 90 minutes, and still more preferably 1 to 60 minutes although the time depends on the method for performing the heat treatment.

The amount of the carbonyl group to be introduced into the polymer chain can be adjusted by appropriately adjusting the amount and type of the oxidizing agent, the temperature of the heat treatment, the time for the heat treatment, and the heat treatment method.

A double bond is introduced, and a polyene group is preferably introduced in the polymer main chain by heat-treating the partially saponified polyvinyl ester. Examples of the polyene group include a conjugated double bond having two double bonds, and a conjugated double bond having three double bonds. In the above-described formula, n is preferably 1 to 5, more preferably 1 to 3.

The temperature of the heat treatment is preferably 50 to 200° C., more preferably 90 to 180° C., and still more preferably 100 to 160° C.

The time for the heat treatment is preferably 0.5 to 600 minutes, more preferably 1 to 360 minutes although the time depends on the method for performing the heat treatment.

The type, amount, and the like of the double bond to be introduced into the polymer chain can be adjusted by appropriately adjusting the amount and type of the oxidizing agent, the temperature of the heat treatment, the time for the heat treatment, and the heat treatment method.

It is to be noted that the heat treatment method in the step (3) is not particularly limited, and the heat treatment can be performed using, for example, a stirring and heating apparatus, an extrusion machine, a dryer, infrared heating, and an oven.

(Method for Producing Polyvinyl Chloride)

The polyvinyl alcohol according to the present invention can be used as a dispersant for suspension polymerization for polyvinyl chloride. The method for producing polyvinyl chloride using the polyvinyl alcohol according to the present invention as a dispersant may be performed, for example, in the following manner.

A step of preparing a suspension liquid by mixing the polyvinyl alcohol according to the present invention, the vinyl chloride monomer, and water may be performed, and subsequently a step of polymerizing the vinyl chloride monomer may be performed.

The order of adding the polyvinyl alcohol, the vinyl chloride monomer, and water is not particularly limited, and, for example, the suspension liquid may be prepared by adding the polyvinyl alcohol into a solution containing the vinyl chloride monomer and water and mixing the resultant mixture. Mixing can be performed with a publicly known stirring apparatus.

The amount of use of the polyvinyl alcohol is preferably 0.01 to 5% by mass, more preferably 0.02 to 0.2% by mass based on the vinyl chloride monomer.

The polyvinyl alcohol according to the present invention can form a stable suspension liquid or dispersion liquid by addition thereof as a dispersant. For example, a liquid droplet having a median diameter in a range of 10 to 200 μm can be formed.

In addition, an additional dispersant other than the polyvinyl alcohol according to the present invention may be used together with the polyvinyl alcohol according to the present invention. Examples of the additional dispersant include cellulose and cellulose derivatives. Examples of the cellulose derivatives include methyl cellulose, ethyl cellulose, hydroxymethyl cellulose, hydroxypropyl methylcellulose, hydroxybutyl methylcellulose, hydroxyethyl cellulose, and carboxymethyl cellulose. In addition, as the additional dispersant, polyvinyl alcohol other than the polyvinyl alcohol according to the present invention may be used. It is to be noted that the proportion of the polyvinyl alcohol according to the present invention based on the total amount of the dispersant is 60% by mass or more, more preferably 80% by mass or more, and preferably 90% by mass or more.

The vinyl chloride monomer in an amount to be used for polymerization may be blended at once, or part of the vinyl chloride monomer may be added firstly, and the rest may be added after the polymerization is initiated.

The suspension liquid can further contain one or more additives such as a polymerization initiator, an antioxidizing agent, and a pH adjusting agent.

Examples of the polymerization initiator include di-2-ethylhexyl peroxydicarbonate, diethoxyethyl peroxydicarbonate, α-cumyl peroxyneodecanoate, t-butyl peroxyneodecanoate, t-butyl peroxypivalate, t-butyl peroxy-3,5,5-trimethylhexanoate, acetyl cyclohexyl sulfonyl peroxide, 2,4,4-trimethylpentyl-2-peroxyphenoxy acetate, and lauroyl peroxide, and these may be used singly, or two or more thereof may be used together.

Examples of the antioxidizing agent include hindered phenol-based antioxidizing agents.

Examples of the pH adjusting agent include sodium bicarbonate, sodium carbonate, potassium bicarbonate, potassium carbonate, sodium citrate, potassium citrate, sodium tartrate, potassium tartrate, sodium benzoate, and potassium benzoate, and these may be used singly, or two or more thereof may be used together.

After the suspension liquid is formed in the manner as described above, the suspension liquid is heated to polymerize the vinyl chloride monomer. The temperature in performing the polymerization is about 20 to about 90° C. After the polymerization is initiated, the vinyl chloride monomer can be further added.

The average particle diameter of polyvinyl chloride which is obtained is preferably 130 to 170 μm, more preferably 140 to 160 μm. The polyvinyl chloride having such an average particle diameter has a good handling property. The porosity of the polyvinyl chloride which is obtained is preferably 17 to 30%, more preferably 18 to 25%. The polyvinyl chloride having such a porosity has a good processability.

When the polyvinyl alcohol according to the present invention is used as a dispersant, the average particle diameter and the porosity in the above-described range are easily satisfied simultaneously, so that polyvinyl chloride having a good handling property and a good processability can be obtained.

As described above, according to the present invention, polyvinyl alcohol that has a good dispersing ability, that can suppress foaming during polymerization, that can make the handling property and processability of the polyvinyl chloride which is obtained good, and that is to be used as a dispersant for suspension polymerization for polyvinyl chloride; and a method for producing polyvinyl chloride using the polyvinyl alcohol can be provided.

EXAMPLES

Hereinafter, the present invention will be described more specifically giving Examples, but the present invention is not limited to these Examples.

(Preparation of Specimen)

Synthesis Example 1

Into a reactor equipped with a thermometer, a stirrer, and a cooling pipe, 100 parts by weight of a vinyl acetate monomer and 40 parts by weight of methanol were added, nitrogen purge was conducted by blowing a nitrogen gas for 30 minutes, and thereafter the reactor was heated at 60° C. for 30 minutes. Subsequently, 0.03 parts by weight of 2-ethylhexyl peroxydicarbonate ("TrigonoxEHP" manufactured by Tianjin McEIT Co., Ltd.) being a polymerization initiator was added thereto, and thereafter reaction was performed at 60° C. for 4 hours. After the reaction time ended, the reaction liquid was cooled. The rate of polymerization was measured after cooling the reaction mixture to find that the rate of the reaction was 40%. Subsequently, the operation of removing the residual vinyl acetate monomer with methanol was performed under a reduced pressure while adding methanol, and thus a methanol solution containing 50% by weight of polyvinyl acetate was obtained. To the methanol solution, a methanol solution of sodium hydroxide was added so as to make the amount of sodium hydroxide 0.003 mol % based on the amount of vinyl acetate, and saponification was then performed at 40° C. At a stage of completing the saponification, 1.2% by weight of hydrogen peroxide based on the amount of the polyvinyl acetate was added to the solution. A solid component obtained was taken out, pulverized, washed with methanol, and then dried to obtain an intermediate raw material 1. The obtained intermediate raw material 1 was charged into a batch system stirring and heating apparatus to raise the temperature to 135° C., and thereafter heating was performed for 4 hours to obtain polyvinyl alcohol S1.

Synthesis Example 2

Into a reactor equipped with a thermometer, a stirrer, and a cooling pipe, 100 parts by weight of a vinyl acetate monomer and 40 parts by weight of methanol were added, nitrogen purge was conducted by blowing a nitrogen gas for 30 minutes, and thereafter the reactor was heated at 60° C. for 30 minutes. Subsequently, 0.03 parts by weight of 2-ethylhexyl peroxydicarbonate ("TrigonoxEHP" manufactured by Tianjin McEIT Co., Ltd.) being a polymerization initiator was added thereto, and thereafter reaction was performed at 60° C. for 4 hours. After the reaction time ended, the reaction liquid was cooled. The rate of polymerization was measured after cooling the reaction mixture to find that the rate of the reaction was 40%. Subsequently, the operation of removing the residual vinyl acetate monomer with methanol was performed under a reduced pressure while adding methanol, and thus a methanol solution containing 50% by weight of polyvinyl acetate was obtained. To the methanol solution, a methanol solution of sodium hydroxide was added so as to make the amount of sodium hydroxide 0.003 mol % based on the amount of vinyl acetate, and saponification was then performed at 40° C. At a stage of completing the saponification, 1.2% by weight of hydrogen peroxide based on the amount of the polyvinyl acetate was added to the solution. A solid component obtained was taken out, pulverized, washed with methanol, and then dried to obtain an intermediate raw material 2. The obtained intermediate raw material 2 was charged into a batch system stirring and heating apparatus to raise the temperature to 135° C., and thereafter heating was performed for 3 hours to obtain polyvinyl alcohol S2.

Synthesis Example 3

Into a reactor equipped with a thermometer, a stirrer, and a cooling pipe, 100 parts by weight of a vinyl acetate monomer and 40 parts by weight of methanol were added, nitrogen purge was conducted by blowing a nitrogen gas for 30 minutes, and thereafter the reactor was heated at 60° C. for 30 minutes. Subsequently, 0.03 parts by weight of 2-ethylhexyl peroxydicarbonate ("TrigonoxEHP" manufactured by Tianjin McEIT Co., Ltd.) being a polymerization initiator was added thereto, and thereafter reaction was performed at 60° C. for 4 hours. After the reaction time ended, the reaction liquid was cooled. The rate of polymerization was measured after cooling the reaction mixture to find that the rate of the reaction was 40%. Subsequently, the operation of removing the residual vinyl acetate monomer with methanol was performed under a reduced pressure while adding methanol, and thus a methanol solution containing 50% by weight of polyvinyl acetate was obtained. To the methanol solution, a methanol solution of sodium hydroxide was added so as to make the amount of sodium hydroxide 0.003 mol % based on the amount of vinyl acetate, and saponification was then performed at 40° C. At a stage of completing the saponification, 0.7% by weight of hydrogen peroxide based on the amount of the polyvinyl acetate was added to the solution. A solid component obtained was taken out, pulverized, washed with methanol, and then dried to obtain an intermediate raw material 3. The obtained intermediate raw material 3 was charged into a batch system stirring and heating apparatus to raise the temperature to 135° C., and thereafter heating was performed for 4 hours to obtain polyvinyl alcohol S3.

Synthesis Example 4

Into a reactor equipped with a thermometer, a stirrer, and a cooling pipe, 100 parts by weight of a vinyl acetate monomer and 40 parts by weight of methanol were added, nitrogen purge was conducted by blowing a nitrogen gas for 30 minutes, and thereafter the reactor was heated at 60° C. for 30 minutes. Subsequently, 0.03 parts by weight of 2-ethylhexyl peroxydicarbonate ("TrigonoxEHP" manufactured by Tianjin McEIT Co., Ltd.) being a polymerization initiator was added thereto, and thereafter reaction was performed at 60° C. for 4 hours. After the reaction time ended, the reaction liquid was cooled. The rate of polymerization was measured after cooling the reaction mixture to find that the rate of the reaction was 40%. Subsequently, the operation of removing the residual vinyl acetate monomer with methanol was performed under a reduced pressure while adding methanol, and thus a methanol solution containing 50% by weight of polyvinyl acetate was obtained. To the methanol solution, a methanol solution of sodium hydroxide was added so as to make the amount of sodium hydroxide 0.003 mol % based on the amount of vinyl acetate, and saponification was then performed at 40° C. A solid component obtained was taken out, pulverized, washed with methanol, and then dried to obtain a polyvinyl alcohol intermediate raw material 4. The obtained polyvinyl alcohol intermediate raw material 4 was charged into a continuous system stirring apparatus, hydrogen peroxide was sprinkled thereon so as to be 0.75% by weight based on the amount of polyvinyl alcohol, the resultant mixture was then charged into a batch system stirring and heating apparatus to raise the temperature to 137° C., and thereafter heating was performed for 9 hours to obtain polyvinyl alcohol S4.

Synthesis Example 5

Into a reactor equipped with a thermometer, a stirrer, and a cooling pipe, 100 parts by weight of a vinyl acetate monomer and 40 parts by weight of methanol were added, nitrogen purge was conducted by blowing a nitrogen gas for 30 minutes, and thereafter the reactor was heated at 60° C. for 30 minutes. Subsequently, 0.03 parts by weight of 2-ethylhexyl peroxydicarbonate ("TrigonoxEHP" manufactured by Tianjin McEIT Co., Ltd.) being a polymerization initiator was added thereto, and thereafter reaction was performed at 60° C. for 4 hours. After the reaction time ended, the reaction liquid was cooled. The rate of polymerization was measured after cooling the reaction mixture to find that the rate of the reaction was 40%. Subsequently, the operation of removing the residual vinyl acetate monomer with methanol was performed under a reduced pressure while adding methanol, and thus a methanol solution containing 50% by weight of polyvinyl acetate was obtained. To the methanol solution, a methanol solution of sodium hydroxide was added so as to make the amount of sodium hydroxide 0.003 mol % based on the amount of vinyl acetate, and saponification was then performed at 40° C. At a stage of completing the saponification, 1.5% by weight of hydrogen peroxide based on the amount of the polyvinyl acetate was added to the solution. A solid component obtained was taken out, pulverized, washed with methanol, and then dried to obtain an intermediate raw material 3. The obtained intermediate raw material 3 was charged into a batch system stirring and heating apparatus to raise the temperature to 140° C., and thereafter heating was performed for 6 hours to obtain polyvinyl alcohol C1.

[Evaluation Method]

(Degree of Saponification)

Evaluation of the degree of saponification was conducted in accordance with JIS K6726.

(Block Character)

The block character was measured by the method described in the present specification. The measurement method is in accordance with the description in Macromolecules, 1982, 15, 1071.

($^1$H-NMR Measurement)

A Bruker instrument (400 MHz) was used for $^1$H-NMR. DMSO solutions containing 5% by mass of the respective specimens was prepared. Measurement was conducted using a peak of DMSO (2.49 ppm) as a standard with an exponential function (0.2 Hz), integration of 1024 times (Prodigy type probe) or 10000 times (normal probe), a delay time of 1 second, and a pulse interval of 12 microseconds.

Figure 2:
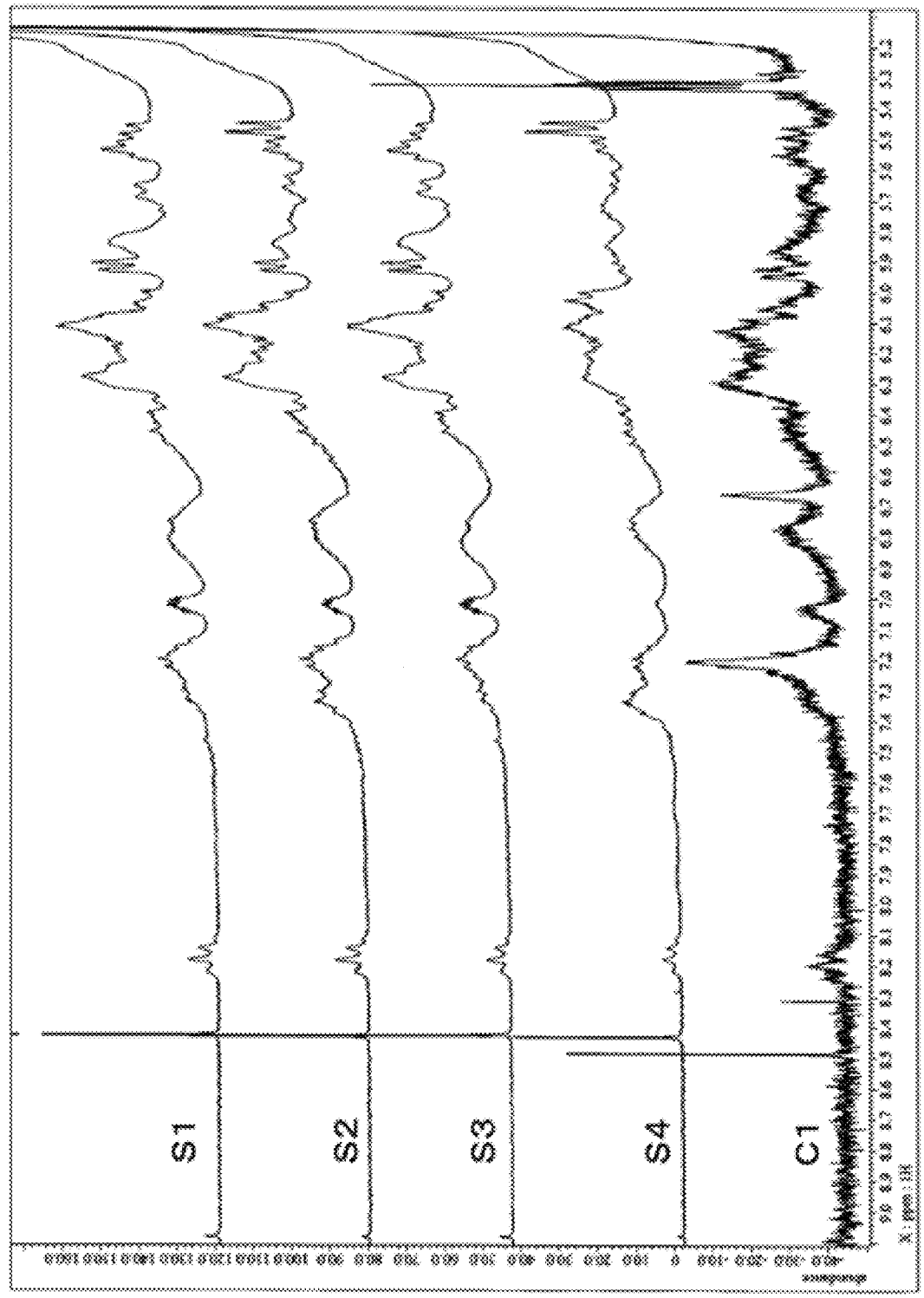
FIG. 2 is a diagram obtained by enlarging a part of the $^1$H-NMR spectra in FIG. 1.

The $^1$H-NMR spectra of the specimens are compared in FIG. 1 and FIG. 2, and (a) to (d) in the $^1$H-NMR spectrum of the sample S1 are illustrated in FIG. 3.

(UV Absorbance)

The absorbance at 320 nm was measured preparing an aqueous solution containing 0.1% by mass of polyvinyl alcohol. An Evolution 600 UV-Vis Spectrophotometer (Thermo Fisher, Pittsburgh, Pa., USA) was used as a measurement apparatus.

(Clouding Point)

The clouding point was evaluated by visual observation while an aqueous solution containing 1% by mass of polyvinyl alcohol was heated.

(Viscosity)

The viscosity was measured at 20° C. preparing an aqueous solution containing 4% by mass of polyvinyl alcohol and using a Brookfield viscometer (model LVDV-II+ Pro) and #18 spindle at 100 rpm.

(Carbonyl Group Index)

The evaluation of the carbonyl group index was conducted through reaction selectivity of 2,4-dinitrophenylhydrazine (DNPH) to the carbonyl group and quantitative evaluation of an HPLC chromatogram (detector: UV spectrum) using the coloration property of DNPH. Next, a specific evaluation method is described.

1. Preparation of Specimen

In a 500 mL Erlenmeyer flask, 1 g of a polyvinyl alcohol specimen and 89.0 g of water were placed, 10 mL of a 0.5 M sodium hydroxide aqueous solution was added thereto under stirring, and the resultant mixture was stirred for 1 hour to prepare a solution of completely saponified polyvinyl alcohol specimen. The reason for complete saponification is to make the separation of a peak derived from polyvinyl alcohol and a peak derived from unreacted DNPH in HPLC easy. The solution of the polyvinyl alcohol specimen was measured and taken out in an amount of 1.00 mL, 0.10 mL of an ethanol solution containing 9% of DNPH (manufactured by TCI) (containing a largely excessive amount of DNPH when compared to the amount of carbonyl group) was added thereto, the resultant mixture was left to stand at 70° C. for 15 hours after the flask was tightly sealed, and thus a solution of DNPH-modified polyvinyl alcohol in which the carbonyl group is modified by 2,4-dinitrophenylhydrazine (hereinafter, sample solution) was prepared. Moreover, a solution obtained by adding 0.1 mL of water to the 1.0 ml of solution of the polyvinyl alcohol specimen (hereinafter, baseline solution) was also prepared and was left to stand at 70° C. for 15 hours after the flask was sealed tightly.

2. Evaluation of Carbonyl Group Index by HPLC

Into HPLC LC-20AD (column: PLRP-S1000A 5 µm 50×4.6 MM manufactured by Agilent Technologies, Inc., and UV detector SPD-M20A) manufactured by SHIMADZU CORPORATION, 10 µL of the obtained sample solution was introduced, and a chromatogram was made using the UV detector to conduct evaluation. In the measurement, a mixed solvent of acetonitrile and water was used as a solvent, and the elution speed was adjusted by increasing the ratio of acetonitrile from 20% between 0 and 4 minutes to 45% between 4 and 12 minutes. In that case, the amount of solvent elution was set to 1 mL/min, and the temperature of the column was set to 65° C. Under these conditions, polyvinyl alcohol elutes earlier (1 to 3 minutes), and unreacted DNPH elutes later (8 to 10 minutes), so that the two can be completely separated. The detection wavelength in HPLC was set to 358 nm, which is the absorption maximum wavelength of DNPH in the ultraviolet region, and a difference in peak areas in elution time from 1 to 3 minutes between (1) the sample solution and (2) the base line solution, (1)−(2)(×10$^6$), was calculated and used as the carbonyl group index.

(Average Particle Diameter)

The average particle diameter of polyvinyl chloride produced in each of Examples and Comparative Examples was measured with a particle size analyzer.

(Bulk Density)

The bulk density of polyvinyl chloride produced in each of Examples and Comparative Examples was measured in accordance with JIS K 6721.

(Porosity)

The porosity was calculated by the amount of mercury pressed in a resin when the pressure is applied up to 2000 kg/cm$^2$ with a mercury porosimeter.

(Foaming Property)

The foaming property was evaluated by the amount of scale adhering to an inner wall or a stirring blade through visual observation when the lid of the reactor was opened immediately after the reaction was completed. The evaluation was conducted according to the following criteria.

G: Scale is not observed, or a small amount of scale (less than 5% of obtained resin) is observed.

B: A large amount of scale (5% or more of obtained resin) is observed.

TABLE 1

|  | Polyvinyl alcohol | | | | |
| --- | --- | --- | --- | --- | --- |
|  | S1 | S2 | S3 | S4 | C1 |
| Degree of saponification (mol %) | 72.7 | 72.7 | 72.5 | 73.3 | 72.4 |
| 4% Viscosity (cP) | 5.01 | 5.59 | 5.21 | 6.90 | 5.90 |
| Block character | 0.44 | 0.45 | 0.42 | 0.48 | 0.47 |

TABLE 1-continued

|  | Polyvinyl alcohol | | | | |
|---|---|---|---|---|---|
|  | S1 | S2 | S3 | S4 | C1 |
| UV absorbance at 320 nm | 0.27 | 0.26 | 0.20 | 0.29 | 0.33 |
| Carbonyl group index | 1.75 | 1.64 | 0.89 | 1.85 | 2.17 |
| Clouding point (° C.) | 40 | 38 | 38 | 40 | 35 |
| $^1$H-NMR spectrum | | | | | |
| (a) | 0.071 | 0.055 | 0.063 | 0.064 | 0.088 |
| (b) | 0.12 | 0.053 | 0.11 | 0.018 | 0.13 |
| (c) | 0.57 | 0.5 | 0.51 | 0.27 | 0.78 |
| (d) | 0.15 | 0.15 | 0.12 | 0.15 | 0.23 |

Example 1

Polyvinyl chloride was produced in the manner as described below using polyvinyl alcohol S1 as a dispersant, and each kind of evaluation was conducted.

Polymerization was performed in a 200 L reactor equipped with a Dual Pfaudler type impeller. The reactor was charged with 100 kg of water, and 3.5 g of partially saponified polyvinyl alcohol having a degree of saponification of 80 mol % and 35 g of partially saponified polyvinyl alcohol (S1) having a degree of saponification of 72.7 mol % (500 ppm/vinyl chloride monomer) each as a dispersant, and the pressure was reduced to remove the air in the polymerization vessel. The polymerization vessel was then charged with 70 kg of a vinyl chloride monomer, 150 ppm of t-butyl peroxyneodecanoate based on the amount of the vinyl chloride monomer, and 385 ppm of cumyl peroxyneodecanoate based on the amount of the vinyl chloride monomer. Polymerization was performed at 57° C. under stirring at 450 rpm, and when the pressure in the polymerization vessel was lowered to 7.0 kg/cm$^2$, the unreacted vinyl chloride monomer was collected, and the content was taken out and was dehydrated and dried to obtain polyvinyl chloride.

Evaluation results for the obtained polyvinyl chloride are shown in Table 2.

Examples 2 to 4 and Comparative Example 1

Polyvinyl chloride was produced in the same manner as in Example 1 except that polyvinyl alcohol as shown in Table 2 was used in place of polyvinyl alcohol S1. Evaluation results for the obtained polyvinyl chloride are shown in Table 2.

Comparative Example 2

Polyvinyl chloride was produced in the same manner as in Example 1 except that polyvinyl alcohol C1 was used in place of polyvinyl alcohol S1 and the amount of use of the polyvinyl alcohol C1 was 28 g (400 ppm/vinyl chloride monomer). Evaluation results for the obtained polyvinyl chloride are shown in Table 2.

TABLE 2

|  | Polyvinyl alcohol | | Polyvinyl chloride | | | |
|---|---|---|---|---|---|---|
|  | Type | Amount blended (ppm) | Average particle diameter (μm) | Bulk density (g/cm$^3$) | Porosity (%) | Foaming property |
| Example 1 | S1 | 500 | 151 | 0.592 | 20.9 | G |
| Example 2 | S2 | 500 | 154 | 0.584 | 18.9 | G |
| Example 3 | S3 | 500 | 156 | 0.593 | 20.3 | G |
| Example 4 | S4 | 500 | 147 | 0.593 | 18.9 | G |
| Comparative Example 1 | C1 | 500 | 110 | 0.621 | 16.8 | G |
| Comparative Example 2 | C1 | 400 | 150 | 0.641 | 14.5 | B |

Polyvinyl chloride produced using, as a dispersant for suspension polymerization for polyvinyl chloride, polyvinyl alcohol that satisfies the requirements of the present invention had an average particle diameter of 147 to 151 μm to find that the polyvinyl alcohol has a good dispersing ability because the polyvinyl chloride has an easy-to-handle size. Moreover, the obtained polyvinyl chloride has a high porosity and therefore is suitable for processing. Furthermore, it was found that foaming during polymerization is suppressed.

On the other hand, in the case where polyvinyl alcohol C1 having a UV absorbance at a wavelength of 320 nm of exceeding 0.3 was used as a dispersant for suspension polymerization for polyvinyl chloride, the dispersing ability is excessively high to make the size of polyvinyl chloride which is obtained too small. Further, the obtained polyvinyl chloride has a low porosity to make the processing property poor. When the average particle diameter was adjusted by reducing the amount of polyvinyl alcohol C1, the porosity became lower to make the processability worse. Moreover, foaming during polymerization occurred frequently.

The invention claimed is:
1. Polyvinyl alcohol to be used as a dispersant for suspension polymerization for polyvinyl chloride, the polyvinyl alcohol having:
a degree of saponification of 60 to 80 mol %;
a block character of 0.4 to 0.6;
an integration value defined by the following (a) of 0.04 to 0.1 and an integration value defined by the following (b) of 0.01 to 0.2 in a $^1$H-NMR spectrum; and
an UV absorbance of 0.18 or more and less than 0.3 measured at wavelength of 320 nm with respect to a 0.1% by mass aqueous solution of the polyvinyl alcohol:

(a) an integration value from 5.42 to 5.62 ppm of a peak or peaks observed at 5.50 to 5.54 ppm when an integration value from 3.65 to 4.05 ppm of a peak or peaks observed at 3.83 to 3.87 ppm is assumed to be 100; and (b) an integration value from 5.76 to 5.98 ppm of a peak or peaks observed at 5.86 to 5.90 ppm when an integration value from 3.65 to 4.05 ppm of a peak or peaks observed at 3.83 to 3.87 ppm is assumed to be 100.

2. The polyvinyl alcohol according to claim 1, having a carbonyl group index of 0.5 or more.

3. The polyvinyl alcohol according to claim 1, having an integration value defined by the following (c) of 0.2 to 0.7 and an integration value defined by the following (d) of 0.1 to 0.2:

(c) an integration value from 5.98 to 7.09 ppm of a peak or peaks observed at 6.51 to 6.55 ppm when an integration value from 3.65 to 4.05 ppm of a peak or peaks observed at 3.83 to 3.87 ppm is assumed to be 100; and (d) an integration value from 7.09 to 7.72 ppm of a peak or peaks observed at 7.39 to 7.41 ppm when an integration value from 3.65 to 4.05 ppm of a peak or peaks observed at 3.83 to 3.87 ppm is assumed to be 100.

4. The polyvinyl alcohol according to claim 1, wherein a 4% by mass aqueous solution of the polyvinyl alcohol has a viscosity of 4 to 10 cP.

5. The polyvinyl alcohol according to claim 1, having a clouding point of 35 to 50° C.

6. A dispersant comprising the polyvinyl alcohol according to claim 1.

7. The polyvinyl alcohol according to claim 1, produced by a production method comprising the following steps (1) to (3):

a step (1) of producing a polyvinyl ester by polymerizing a vinyl ester monomer;

a step (2) of producing a partially saponified polyvinyl ester by partially saponifying the polyvinyl ester; and a step (3) of heat-treating the partially saponified polyvinyl ester.

8. The polyvinyl alcohol according to claim 7, wherein the vinyl ester monomer is a vinyl acetate monomer.

9. The polyvinyl alcohol according to claim 7, wherein the step (2) of producing a partially saponified polyvinyl ester by partially saponifying the polyvinyl ester is performed in the presence of a peroxide and an alkali compound.

10. The polyvinyl alcohol according to claim 9, wherein the peroxide is hydrogen peroxide, and the alkali compound is sodium hydroxide.

11. A method for producing polyvinyl chloride, the method comprising:

a step of preparing a suspension liquid by mixing the polyvinyl alcohol according to claim 1, a vinyl chloride monomer, and water; and a step of polymerizing the vinyl chloride monomer.

* * * * *